United States Patent Office 2,864,281
Patented Dec. 16, 1958

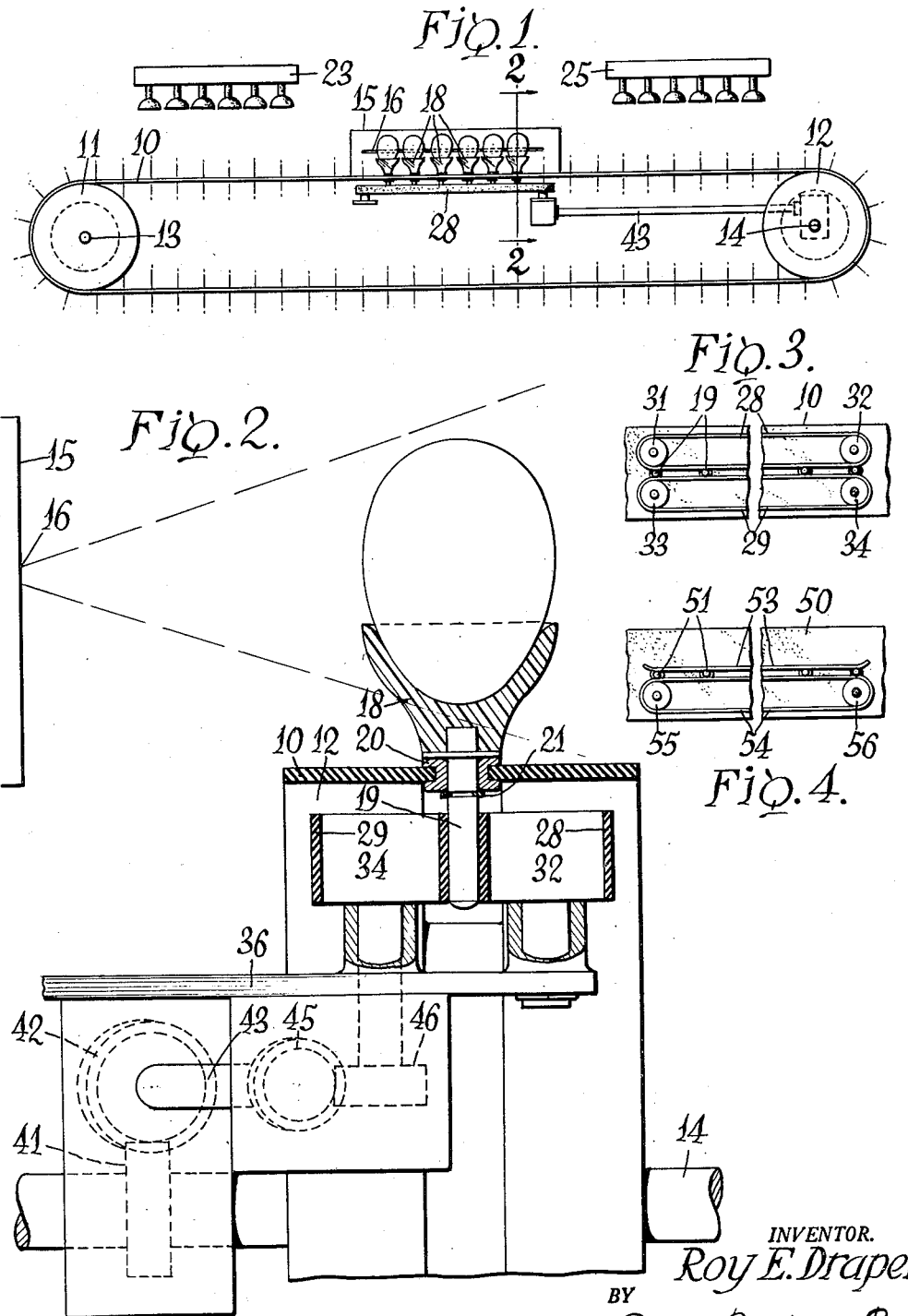

2,864,281

EGG CANDLING APPARATUS

Roy E. Draper, Albion, N. Y.

Application January 12, 1956, Serial No. 558,761

4 Claims. (Cl. 88—14.8)

This invention relates to apparatus for candling eggs and, more particularly, to apparatus for moving a series of eggs past a source of illumination while spinning the individual eggs for visual inspection.

A great part of the candling of eggs is carried out entirely manually. Certain mechanical or automatic egg candling devices have been proposed but these have been, for the most part, of considerable complexity. The adoption and use of complex semi-automatic or automatic machines for this purpose is impractical, particularly since the actual inspection step must still be visual and relay directly on the skill and judgment of the operator.

The apparatus of the present invention provides means which are relatively simple from a mechanical standpoint but which automatically successively present and spin a series of eggs for visual inspection. The present invention is further characterized by the fact that transparent egg cups or holders are provided so that substantially the whole of each egg is subject to inspection during the candling operation, while the individual eggs are nevertheless fully and adequately supported and secured against accidental displacement.

In the form of apparatus which is illustrated herein and described by way of example, the candling apparatus is shown in conjunction with multiple suction cup egg pickup means which may be used to advantage in picking the eggs from an egg crate or other container or holder and depositing them, after candling in egg cartons or other receptacles.

The following specification and the accompanying drawing set forth several embodiments of the present invention for the purpose of illustrating the novel principles of the present invention. However, it is to be understood that such embodiments are by way of example only and that various mechanical changes and modifications may be made without departing from the teachings of the invention, the scope of which is limited only as defined in the appended claims.

In the drawing:

Fig. 1 is a general, somewhat schematic, elevational view of one form of the apparatus of the present invention;

Fig. 2 is a cross sectional view on the line 2—2 of Fig. 1;

Fig. 3 is a fragmentary bottom plan view of the egg support rotating means of the embodiment of Figs. 1 and 2; and Fig. 4 is a fragmentary bottom plan view of a modified egg support rotating arrangement.

Like characters of reference denote like parts throughout the several figures of the drawing and the numeral 10 designates a flexible endless belt which passes about a pair of pulleys 11 and 12. In the illustrated instance pulley 11 is mounted for free rotation on a shaft 13 and pulley 12 is fixed to a shaft 14 which is driven in any desired manner.

By way of reference it will be assumed herein that the upper reach of belt 10 moves from left to right as viewed in Fig. 1. The numeral 15 designates a light box having a slit 16 which emits light against eggs passing adjacent thereto.

A continuous series of transparent cups 18 are connected to belt 10 in a longitudinal endless row for receiving and supporting eggs for passage in front of light slit 16. Egg cups 18 are rotatably associated with belt 10 and their mode of association with the belt may be as shown in detail in Fig. 2.

As there shown each transparent egg cup 18 has fixed to its lower end a spindle 19. A bearing grommet 20 is fixedly associated with belt 10 and spindle 19 extends through the grommet and rotates freely therein. A snap ring or similar retainer 21 prevents accidental or unintended axial movement of spindle 19 in grommet 20.

Referring to Fig. 1, the numeral 23 designates a schematic showing of a gang suction egg lifter device which is adapted to pick up a plurality of eggs from a crate or the like adjacent to the instant apparatus, move such plurality of eggs to a position above belt 10, and deposit them in a corresponding series of the cups 18 for passage along with the upper reach of belt 10. A similar gang suction pickup device 25 is located generally at the right-hand portion above belt 10 to pick up eggs from the cups 18 after they have been candled, for removal to an egg carton or other receptacle.

It is desired to rotate the egg cups 18 as they pass the zone of the light slit 16 at a proper rate of speed in candling. In the primary embodiment this rotation is accomplished by passing the depending spindle portions 19 between a pair of facing belts as best shown in Fig. 3.

Having particular reference to Fig. 3, which is a fragmentary bottom plan view, a pair of belts 28 and 29 disposed beneath the upper reach of belt 10 form a narrow channel therebetween through which the spindles 19 pass in moving along with belt 10. Belt 28 is mounted for free movement on idler pulleys 31 and 32. Belt 29 is mounted on an idler pulley 33 and a driven pulley 34. Since belt 29 is thus driven and belt 28 is free and idle, the engaging surfaces of belt 29 serve to rotate the spindles 19 as they pass between the belts, thus rotating the cups 18 and the eggs contained therein.

The pulleys 32 and 34 are journaled in bearings associated with a bracket 36 which may be attached to the light box 15 or any other adjacent stationary support. As indicated in Figs. 1 and 2, a pair of helical gears 41 and 42 connect drive pulley shaft 14 of the main belt arrangement with a generally longitudinal shaft 43 and a further pair of helical gears 45 and 46 connect the opposite end of shaft 43 with pulley 34, whereby the latter is drivingly rotated upon driving movement of the main belt arrangement through rotation of drive shaft 14.

An alternative mode of rotating the spindles is illustrated in Fig. 4. This embodiment is the same as that of Figs. 1, 2 and 3 with the exception that no separate drive means for the spindles is required. This is likewise a bottom plan view wherein the numeral 50 designates the belt corresponding to belt 10 of the first-described embodiment and the numerals 51 designate the spindles of the several egg cups. In this embodiment a stationary rail or shoe 53 is secured longitudinally beneath the upper reach of belt 50 and a freely movable belt 54 is mounted on idler pulleys 55 and 56.

Belt 54 serves merely to urge or crowd the spindles 51 against rail 53 and the former roll against the latter as they traverse the space between rail 53 and belt 54, whereby the egg cups associated with spindles 51 are rotated as they pass the light slit.

The egg cups 18 are transparent so that light from slit 16 illuminates the entire egg in each case and the operator or inspector may observe the full expanse of each egg as it passes before light slit 16. Egg cups 18 may be formed of thermoplastic material which, besides being transparent, is moderately flexible, so that the egg cups may receive and hold eggs without damage thereto despite minor irregularities in shape of successive eggs. The egg cups 18 may be of polyethylene resin or any of the other known transparent, somewhat flexible synthetic plastics.

It will be noted from Fig. 2 that the rims of the pulleys 11 and 12 are split to provide a central clearance space to accommodate the inner ends of the grommets 20 and the inwardly projecting portions of the spindles 19. Fig. 1 shows only the six egg cups 18 which are passing before the light slit 16 but it is to be understood that, in the illustrated instance, the row of egg cups is continuous along the belt. In Fig. 1 the center lines of the egg cups which are not illustrated are schematically indicated.

I claim:

1. Egg candling apparatus comprising a pair of longitudinally spaced pulleys having horizontal axes and an endless belt passing over the same, a longitudinal row of bearing members carried by said belt with their bearing axes perpendicular to the belt surface, a series of egg cups disposed exteriorly of said belt and having spindles projecting through said bearing members for rotation therein, illuminating means disposed adjacent to the path of movement of said cups as the latter pass along with the upper reach of said belt and adapted to project light through eggs in said cup for candling, and means at the under side of the upper reach of said belt engageable with the projecting portions of said spindles to rotate the same as the egg cups pass said illuminating means.

2. Egg candling apparatus comprising a pair of longitudinally spaced pulleys having horizontal axes and an endless belt passing over the same, a longitudinal row of bearing members carried by said belt with their bearing axes perpendicular to the belt surface, a series of egg cups disposed exteriorly of said belt and having spindles projecting from their lower ends through said bearing members for rotation therein, illuminating means disposed adjacent to the path of movement of said cups as the latter pass along with the upper reach of said belt and adapted to project light through eggs in said cups for candling, and means at the under side of the upper reach of said belt engageable in rolling contact with the projecting portions of said spindles to rotate the same as the egg cups pass said illuminating means.

3. Egg candling apparatus comprising a pair of longitudinally spaced pulleys having horizontal axes and an endless belt passing over the same, a longitudinal row of bearing members carried by said belt with their bearing axes perpendicular to the belt surface, a series of egg cups of transparent material disposed exteriorly of said belt and having spindles projecting therefrom through said bearing members for rotation therein, illuminating means disposed adjacent to the path of movement of said cups as the latter pass along with the upper reach of said belt and adapted to project light through eggs in said cups for candling, and means at the under side of the upper reach of said belt engageable with the projecting portions of said spindles to rotate the same as the egg cups pass said illuminating means.

4. Egg candling apparatus comprising a pair of longitudinally spaced pulleys having horizontal axes and an endless belt passing over the same, a longitudinal row of bearing members carried by said belt with their bearing axes perpendicular to the belt surface, a series of egg cups disposed at one side of said belt and having spindles projecting through said bearing members for rotation therein, illuminating means disposed adjacent to the path of movement of said cups as the latter pass along the upper side of one of the horizontal reaches of said belt and adapted to project light through eggs in said cup for candling, and means at the under side of said horizontal reach of said belt engageable with the projecting portions of said spindles to rotate the same as the egg cups pass said illuminating means.

References Cited in the file of this patent

UNITED STATES PATENTS

| | | |
|---|---|---|
| 1,795,118 | Hall | Mar. 3, 1931 |
| 1,987,336 | Powell | Jan. 8, 1935 |
| 2,150,375 | Johnson | Mar 14, 1939 |
| 2,451,577 | Roberts | Oct. 19, 1948 |
| 2,487,877 | Johnson et al. | Nov. 15, 1949 |

FOREIGN PATENTS

| | | |
|---|---|---|
| 232,376 | Great Britain | Apr. 23, 1925 |